(12) United States Patent
Herckens et al.

(10) Patent No.: US 12,492,303 B2
(45) Date of Patent: Dec. 9, 2025

(54) POLYTHIOPHENE/POLYANION COMPOSITIONS

(71) Applicant: Agfa-Gevaert NV, Mortsel (BE)

(72) Inventors: Roald Herckens, Mortsel (BE); Johan Loccufier, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 2 days.

(21) Appl. No.: 18/567,187

(22) PCT Filed: Jun. 3, 2022

(86) PCT No.: PCT/EP2022/065147
§ 371 (c)(1),
(2) Date: Dec. 5, 2023

(87) PCT Pub. No.: WO2022/258501
PCT Pub. Date: Dec. 15, 2022

(65) Prior Publication Data
US 2024/0279453 A1    Aug. 22, 2024

(30) Foreign Application Priority Data

Jun. 8, 2021    (EP) .................................. 21178190

(51) Int. Cl.
*C08L 25/18*    (2006.01)
*C08F 212/32*   (2006.01)
(Continued)

(52) U.S. Cl.
CPC ............ *C08L 25/18* (2013.01); *C08F 212/32* (2013.01); *H01G 9/0036* (2013.01); *H01G 9/028* (2013.01);
(Continued)

(58) Field of Classification Search
CPC .......... C08G 61/126; C08G 2261/3223; C08G 2261/1424; C08G 2261/1412; C08G 2261/3243; C08G 2261/11; C08G 2261/122; C08G 2261/126; C08G 2261/1452; C08G 2261/43; C08G 2261/794; C08G 2261/90; C08G 2261/145; C08G 2261/51; H10K 85/113;
(Continued)

(56) References Cited

U.S. PATENT DOCUMENTS

| | | |
|---|---|---|
| 6,635,729 B1 | 10/2003 | Groenendaal et al. |
| 2003/0149171 A1 | 8/2003 | Groenendaal et al. |

(Continued)

FOREIGN PATENT DOCUMENTS

| | | |
|---|---|---|
| EP | 1122274 A1 | 8/2001 |
| EP | 1323763 A1 | 7/2003 |

(Continued)

OTHER PUBLICATIONS

Beaumont et al., "Water-Processable Self-Doped Conducting Polymers via Direct (Hetero) arylation Polymerization," *Macromolecules*, 54: 5464-5472 (2021).
European Patent Office, International Search Report in International Patent Application No. PCT/EP2022/065147, mailed Jul. 22, 2022, 5 pp.
European Patent Office, Written Opinion in International Patent Application No. PCT/EP2022/065147, mailed Jul. 22, 2022, 6 pp.
Mantione et al., "Thiophene-Based Trimers for In Vivo Electronic Functionalization of Tissues," *ACS Appl. Electron. Mater.*, 2: 4065-4071 (2020).

(Continued)

*Primary Examiner* — Mark Kopec
*Assistant Examiner* — Jaison P Thomas
(74) *Attorney, Agent, or Firm* — Leydig, Voit & Mayer, Ltd.

(57) ABSTRACT

A polythiophene dispersion including: (a) a polythiophene copolymer of a first monomer according to Formula I and a second monomer to Formula II, wherein A represents a substituted or unsubstituted $C_1$ to $C_5$ alkylene bridge further functionalized with at least one functional group selected from the group consisting of a sulfonic acid or salt thereof, a phosphonic acid or salt thereof, a phosphate ester or salt thereof, a sulfate ester or salt thereof and a carboxylic acid or salt thereof; B represents a substituted or unsubstituted $C_1$ to $C_5$ alkylene bridge with the proviso that B is not further functionalized with a pH responsive group; and a molar ratio of the first monomer to the second monomer is from 1/4 to 4/1, (b) a polymeric polyanion wherein at least 75 mol % of the monomeric units of the polymeric polyanion are functionalized with a functional group selected from the group consisting of a sulfonic acid or salt thereof, a phosphonic acid or salt thereof, a phosphate ester or salt thereof, a sulfate ester or salt thereof and a carboxylic acid or salt thereof, characterized in that a molar ratio of the functional groups of the polyanion to the sum of the first and second monomers of the polythiophene copolymer is from 1.1 to 1.75.

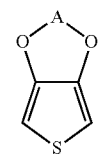

Formula I

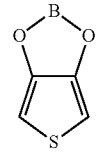

Formula II

15 Claims, No Drawings

(51) Int. Cl.
   *H01G 9/00* (2006.01)
   *H01G 9/028* (2006.01)
(52) U.S. Cl.
   CPC ....... *C08L 2201/50* (2013.01); *C08L 2203/20* (2013.01); *C08L 2205/02* (2013.01)
(58) Field of Classification Search
   CPC .. H10K 85/1135; H10K 85/151; H01B 1/127; H01B 1/124; C08L 25/18; C08L 2201/50; C08L 2203/20; C08L 2205/02; C08L 65/00; C08F 212/32; C08F 112/30; C08F 212/30; H01G 9/0036; H01G 9/028; H01G 11/48; C09D 125/18; C09D 165/00
   See application file for complete search history.

(56) References Cited

U.S. PATENT DOCUMENTS

| | | | |
|---|---|---|---|
| 2005/0009986 A1 | 1/2005 | Groenendaal et al. | |
| 2005/0053801 A1* | 3/2005 | Elschner | H10K 85/1135 428/690 |
| 2012/0018662 A1 | 1/2012 | Sugihara et al. | |
| 2013/0163150 A1* | 6/2013 | Nobuta | B32B 27/40 252/500 |
| 2015/0337061 A1 | 11/2015 | Yano et al. | |
| 2016/0012971 A1* | 1/2016 | Takatani | H01G 9/151 29/25.03 |

FOREIGN PATENT DOCUMENTS

| | | |
|---|---|---|
| EP | 1323764 A1 | 7/2003 |
| EP | 1458785 B1 | 5/2007 |
| EP | 2508547 A1 | 10/2012 |
| EP | 3037497 A1 | 6/2016 |
| EP | 2901464 B1 | 8/2020 |
| JP | 2005-513219 A | 5/2005 |
| JP | 2015-168793 A | 9/2015 |
| JP | 2017-197659 A | 11/2017 |
| JP | 2020-202123 A | 12/2020 |
| WO | WO 2014/048561 A2 | 4/2014 |
| WO | WO 2015/194657 A1 | 12/2015 |
| WO | WO 2020/040851 A1 | 2/2020 |

OTHER PUBLICATIONS

Stéphan et al., "Electrochemical behaviour of 3,4-ethylenedioxythiophene functionalized by a sulphonate group. Application to the preparation of poly(3,4-ethylenedioxythiophene) having permanent cation-exchange properties," *J. of Electroanalytical Chemistry*, 443: 217-226 (1998).

Xiao et al., "Electrochemical polymerization and properties of PEDOT/S-EDOT on neural microelectrode arrays," *J. of Electroanalytical Chemistry*, 573: 43-48 (2004).

Xu et al., "Emulsion template synthesis of all conducting polymer aerogels with superb adsorption capacity and enhanced electrochemical capacitance," *J. Mater. Chem.*, 22: 8579 (2012).

* cited by examiner

POLYTHIOPHENE/POLYANION COMPOSITIONS

CROSS-REFERENCE TO RELATED APPLICATIONS

This patent application is the U.S. national stage of copending International Patent Application No. PCT/EP2022/065147, filed Jun. 3, 2022, which claims the benefit of European Patent Application No. 21178190.1, filed Jun. 8, 2021.

TECHNICAL FIELD OF THE INVENTION

The present invention relates to novel polythiophene/polyanion compositions and their use in various applications, such as for example polymer capacitors.

BACKGROUND ART FOR THE INVENTION

Environmental concerns over greenhouse gas emissions have stimulated the demand for battery electric and (plug in) hybrid electric vehicles with increasing battery capacities. Control units in these vehicle electronics contain several so-called polymer capacitors.

Polymer hybrid aluminium-electrolytic capacitors are often applied in this field. These capacitors consist of an etched aluminium/aluminium oxide ($Al/Al_2O_3$) foil which serves as the electrode and the dielectric layer, covered by a conductive polymer layer which functions as the counter electrode. Poly(3,4-ethylenedioxy-thiophene):poly(styrene sulfonate) (PEDOT:PSS) is commonly used, a conductive polymer complex which is coated on the $Al/Al_2O_3$ substrate by dip-coating from an aqueous dispersion.

An important aspect of the manufacturing of these capacitors is the penetration of the conductive polymer particles in the $Al/Al_2O_3$ foil. To increase the surface area an etched foil of Al is used, which is then anodized to provide a thin layer of $Al_2O_3$. This process creates a porous $Al/Al_2O_3$ substrate, which is dip-coated with the aqueous PEDOT:PSS dispersion. The particle size of the conductive polymer particles therefore determines the ability of the polymer to penetrate the pores of the $Al/Al_2O_3$ substrate. Therefore, a lower particle size of the conductive polymer dispersion results in a better coating and in a lower equivalent series resistance (ESR) of the capacitor.

Lowering the particle size of these PEDOT:PSS dispersions can be achieved by altering the relative amounts of both polymers in the complex. For the preparation of polymer capacitors a mass ratio of 1:2.5 of PEDOT:PSS is typically applied as this provides a balance between properties such as the surface resistance of the PEDOT:PSS layer and the particle size of the PEDOT:PSS dispersion. If the amount of PSS is increased, smaller particles are obtained with the consequence, however, that the surface resistance strongly increases (Conjugated Polymers 3rd Edition, 2007, CRC Press). Alternatively, decreasing the amount of PSS lowers the surface resistance but strongly increases the viscosity, particle size and number of aggregates (>5 µm) of the PEDOT:PSS dispersion.

WO2014/048561 (Heraeus) discloses different ratios of PEDOT:PSS and their use in polymer capacitors. The PEDOT:PSS ratio is preferably between 0.67 and 1.5. The conductivity is however lower compared to the conductivity of the reference material with a 1:2.5 PEDOT:PSS mass ratio. No effect on the particle size is reported.

JP-A 2020/202123 (Shin-Etsu Polymer) discloses different PEDOT:PSS ratios. Higher conductivities are reported for materials comprising a lower amount of PSS. No influence on the particle sizes of PEDOT:PSS is reported.

WO2020/040851 (Kemet) also describes PEDOT:PSS dispersions with different ratios between the two polymers. The particle size of PEDOT:PSS decreases by increasing the amount of PSS and by altering the synthetic method.

EP-A 1122274 (Agfa Gevaert/Heraeus) discloses the synthesis and polymerization of 4-(2,3-dihydrothieno[3,4-b][1,4]dioxin-3-ylmethoxy)butane-1-sulfonic acid (EDOT-S). As EDOT-S includes a covalently bound sulfonic acid, thiophene polymers prepared with these monomers do not have to be stabilized in water with a polyanion such as PSS. A monomer including an anionic group or a salt thereof is often referred to as a self-doped EDOT monomer.

EP-A 3037497 (Heraeus) discloses a method to prepare water-soluble thiophene polymers using self-doped EDOT derivatives, for example EDOT-S.

In US2016/351339 (Kemet) a polymer capacitor is disclosed including a self-doped polythiophene, referred therein as an intrinsically conductive polymer.

US2015/337061 (Tosoh) discloses the synthesis and polymerization of various self-doped EDOT monomers, for example EDOT-S and a branched alkyl alternative of EDOT-S. Polymers of these materials do not require a stabilization in water by a polyanion as they are water-soluble. The reported conductivity however is often an order of magnitude lower compared to the conductivity of PEDOT:PSS dispersions. Another disadvantage of these conductive polymers are higher costs to prepare them.

EP-A 1458785 (Agfa Gevaert) discloses copolymers of, amongst others, EDOT and EDOT-S. However, the amount of PSS is constant for all copolymers.

WO2015/194657 (Tosoh) describes copolymers of the branched alkyl alternatives of EDOT-S referred to above with at least one other thiophene monomer. As the obtained copolymers are water-soluble no PSS is used. The conductivity is low when compared to the conductivity of PEDOT:PSS dispersions.

In EP-A 2508547 (Tayca) copolymers of alkylated EDOT derivatives and EDOT in combination with PSS and their use in capacitors is disclosed. Copolymers with different molar ratios of the EDOT and EDOT derivatives are prepared, but the amount of PSS is not varied. An effect on the particle size is not described.

EP-A 2901464 (Heraeus) discloses a process for the production of a polymer capacitor wherein both a self-doped (for example prepared from EDOT-S) and a foreign-doped polythiophene polymer (for example PEDOT:PSS) is used.

For the preparation of polymer capacitors there is thus a need for a conductive polymer dispersion which offers a low surface resistance in combination with a smaller particle size.

SUMMARY OF THE INVENTION

It is an object of the invention to provide a conductive polymer dispersion having small particles and a high conductivity and their use in the preparation of polymer capacitors.

The object of the invention is realized by a dispersion as defined in claim 1.

Further objects of the invention will become apparent from the description hereinafter.

DETAILED DESCRIPTION OF THE INVENTION

Definitions

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted alkaryl group is preferably a phenyl or naphthyl group including one, two, three or more $C_1$ to $C_6$-alkyl groups.

Unless otherwise specified a substituted or unsubstituted aralkyl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

Unless otherwise specified a substituted or unsubstituted alkylene group is preferably a $C_1$ to $C_6$-alkylene group.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, amine, ether, thioether, ketone, aldehyde, sulfoxide, sulfone, sulfonate ester, sulphonamide, —Cl, —Br, —I, —OH, —SH, —CN and —$NO_2$.

Conductive Polymer Dispersion

A dispersion comprising a conductive polymer is referred to herein as a conductive polymer dispersion.

The conductive polymer dispersion according to the present invention comprises a polyanion and a conductive polymer as described below.

A dispersion medium of the conductive polymer dispersion is preferably selected from water, a water-soluble organic solvent, or mixtures thereof.

Preferred organic solvents are protic organic solvents, such as alcohols or acids. The dispersion medium is preferably water.

The conductive polymer dispersion may comprise other ingredients such as dispersing agents.

The conductive polymer dispersion is preferably prepared as described below.

The conductive polymer dispersion comprises:
(a) a polythiophene copolymer of a monomer according to Formula I and a monomer according to Formula II,

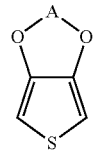

Formula I

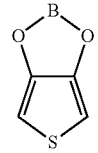

Formula II wherein
A represents a substituted or unsubstituted $C_1$ to $C_5$ alkylene bridge further functionalized with at least one group selected from the group consisting of a sulfonic acid or salt thereof, a phosphonic acid or salt thereof, a phosphate ester or salt thereof, a sulfate ester or salt thereof and a carboxylic acid or salt thereof, B represents a substituted or unsubstituted $C_1$ to $C_5$ alkylene bridge with the proviso that B is not further functionalized with a pH responsive group, the molar ratio of the monomer according to Formula I to the monomer according to Formula II is from 1/4 to 4/1, (b) a polymeric polyanion wherein at least 75 mol % of the monomeric units of the polyanion comprise a substituent selected from the group consisting of a sulfonic acid or salt thereof, a phosphonic acid or salt thereof, a phosphate ester or salt thereof, a sulfate ester or salt thereof and a carboxylic acid or salt thereof, characterized in that the ratio of the molar amount of the functional groups of the polyanion to the sum of the monomeric units according to Formula I and Formula II of the polythiophene is from 1.1 to 1.75

The feature "an alkylene bridge functionalized with at a group" as used herein for Formula I and II means that the group is covalently coupled to the alkylene bridge optionally via a divalent linking group having no more than 20 C atoms. A preferred linking group is an alkylene group or an ether group having no more than 20 C atoms.

The term $C_1$ to $C_5$ alkylene bridge as used herein means an alkylene bridge comprising 1 to 5 carbon atoms.

The molar amount is defined as the ratio of the molar content of monomers in the polymeric polyanion with a functional group selected from the group consisting of a sulfonic acid or salt thereof, a phosphonic acid or salt thereof, a phosphate ester or salt thereof, a sulfate ester or salt thereof and a carboxylic acid or salt thereof to the total molar content of thiophene monomers.

A pH responsive group as used herein means a group which may change from ionic to non-ionic depending on the pH of the surrounding medium. Such a pH responsive group is thus an acid or a base. The pH responsive group is preferably selected from a sulfonic acid or salt thereof, a phosphonic acid or salt thereof, a phosphate ester or salt thereof, a sulfate ester or salt thereof and a carboxylic acid or salt thereof.

The molar ratio of the monomer according to Formula I to the monomer according to Formula II is preferably from 3/7 to 1/1, more preferably from 35/65 to 45/55.

The ratio of the molar amount of the functional groups of the polyanion to the sum of the monomeric units according to Formula I and Formula II of the polythiophene is from 1.1 to 1.75, more preferably from 1.25 to 1.65, most preferably from 1.4 to 1.6.

Conductive Polymer

The conductive polymer dispersion comprises a conductive polymer.

The conductive polymer is a polythiophene.

Such a polythiophene typically has a positive charge located on the main chain of the polymer. The positive charge is preferably, at least partially, compensated by an anion.

When the anion is covalently bound to the polymer, the polymer is then often referred to as a self-doped polymer or an intrinsically conductive polymer. The monomers used to make such self-doped polymers, i.e. comprising an anionic group, are also referred to as self-doped monomers.

When the anion is a separate compound, the polymer is then typically referred to as a foreign-doped polymer or an extrinsically conductive polymer. Anions added as separate compounds are preferably polyanions.

The polythiophene is a copolymer of a monomer according to Formula I and a monomer according to Formula II,

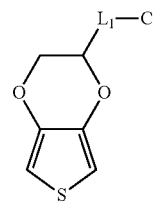

Formula I

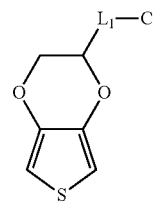

Formula II wherein

A represents a substituted or unsubstituted $C_1$ to $C_5$ alkylene bridge further functionalized with at least one group selected from the group consisting of a sulfonic acid or salt thereof, a phosphonic acid or salt thereof, a phosphate ester or salt thereof, a sulfate ester or salt thereof and a carboxylic acid or salt thereof, B represents a substituted or unsubstituted $C_1$ to $C_5$ alkylene bridge with the proviso that B is not further functionalized with a pH responsive group, the molar ratio of the monomer according to Formula I to the monomer according to Formula II is from 1/4 to 4/1.

Monomeric According to Formula I

The polythiophene includes a monomer according to Formula I.

A in Formula I preferably represents a $C_2$-alkylene bridge.

The polythiophene preferably includes a monomeric unit according to Formula I-a, Formula I-a wherein $L_1$ represents a divalent linking group comprising 1 to 15 carbon atoms, and C represents a functional group selected from the group consisting of a sulfonic acid or salt thereof, a phosphonic acid or salt thereof, a phosphate ester or salt thereof, a sulfate ester or salt thereof and a carboxylic acid or salt thereof.

C preferably represents a sulfonic acid or salt thereof.

The polythiophene more preferably includes a monomeric unit according to Formula I-b, Formula I-b wherein $L_2$ represents a divalent linking group comprising no more than 10 carbon atoms.

M represents a hydrogen or a counterion to compensate the negative charge of the sulfonate group.

Typical monomers according to Formula I are shown in Table 1.

TABLE 1

| Chemical Structure | Monomer I |
|---|---|
| 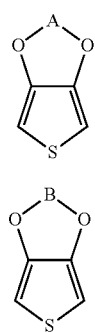 | Monomer I-1 |

TABLE 1-continued

| Chemical Structure | Monomer I |
|---|---|
| 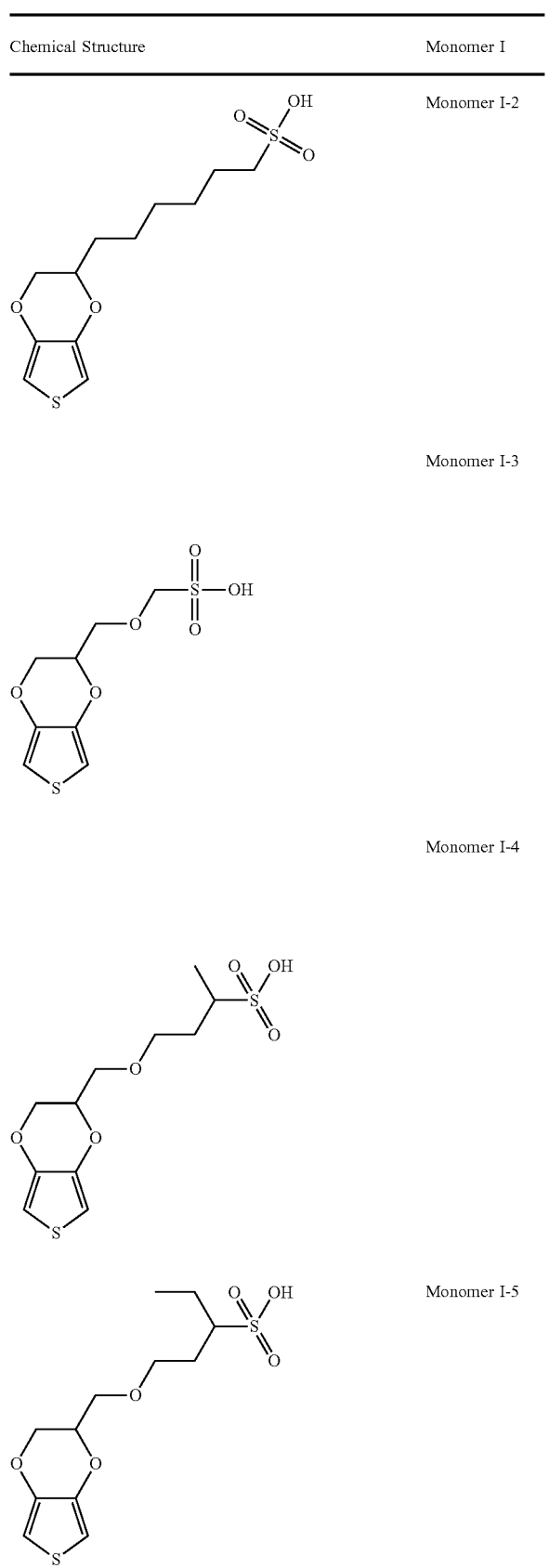 | Monomer I-2 |
| | Monomer I-3 |
| | Monomer I-4 |
| | Monomer I-5 |

TABLE 1-continued

| Chemical Structure | Monomer I |
|---|---|
| 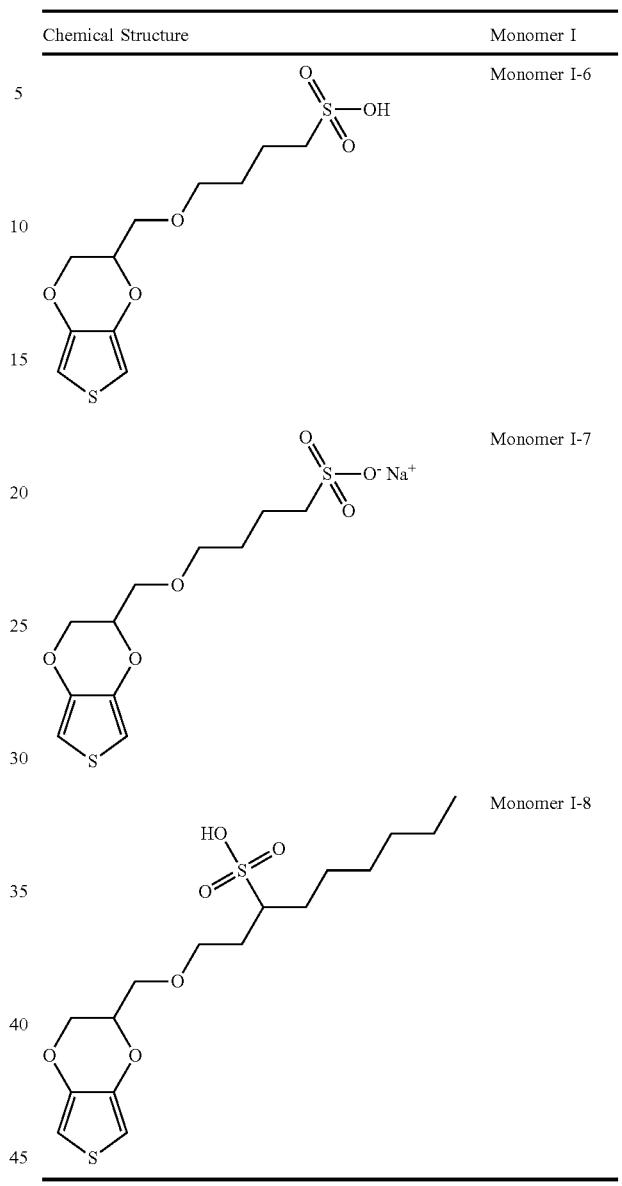 | Monomer I-6 |
| | Monomer I-7 |
| | Monomer I-8 |

Monomer According to Formula II

B in Formula II preferably represents a $C_2$-alkylene bridge.

In a particularly preferred embodiment the monomeric unit according to Formula II is 3,4-ethylenedioxythiophene.

Polyanion

The conductive polymer dispersion comprises a polymeric polyanion wherein at least 75 mol % of the monomeric units of the polyanion comprise a substituent selected from the group consisting of a sulfonic acid or salt thereof, a phosphonic acid or salt thereof, a phosphate ester or salt thereof, a sulfate ester or salt thereof and a carboxylic acid or salt thereof, At least 75 mol %, preferably at least 80 mol %, more preferably at least 90 mol %, most preferably at least 99 mol % of the monomeric units of the polymeric polyanion comprise a functional group selected from the group consisting of a sulfonic acid or salt thereof, a phosphonic acid or salt thereof, a phosphate ester or salt thereof, a sulfate ester or salt thereof and a carboxylic acid or salt thereof.

The functional group is preferably a sulfonic acid or salt thereof.

The polymeric polyanion may be a copolymer of different monomers but is preferably a homopolymer.

In a particularly preferred embodiment the polymeric polyanion is styrene based.

According to a particular preferred embodiment, the polyanion is poly(4-styrenesulfonic acid) or a salt thereof.

The weight average molecular weight (Mw) of the polymeric anion is not particularly limited but is preferably from 1000 to 1 000 000 Da, more preferably from 50 000 to 500 000 Da and most preferably from 100 000 to 300 000 Da.

Preparation of the Conductive Polymer

The polythiophene polymers are preferably prepared by oxidative polymerization of the thiophene monomers described above in an aqueous medium.

In case of foreign-doped polythiophenes, the oxidative polymerization is preferably carried out in the presence of a polyanion.

The concentration of the thiophene monomer in the aqueous phase medium is preferably in a range from 0.1 to 25 wt %, preferably in a range from 0.5 to 10 wt %, all relative to the total weight of the aqueous reaction medium.

Suitable oxidizing agents are iron(III) salts, such as $FeCl_3$, and iron(III) salts of aromatic and aliphatic sulfonic acids; $H_2O_2$; $K_2Cr_2O_7$; $KMnO_4$; alkali metal perborates; alkali metal or ammonium persulfates; and mixtures thereof.

Further suitable oxidants are described, for example, in Handbook of Conducting Polymers (Ed. Skotheim, T. A.), Marcel Dekker: New York, 1986, Vol. 1, pages 46-57.

Particularly preferred oxidizing agents are salts of a peroxydisulfate, in particular $K_2S_2O_8$, $Na_2S_2O_8$; iron(III) salts, in particular iron(III) chloride; or a combination thereof.

A mixture of salts of a peroxydisulfate and at least one further compound that catalyzes the cleavage of the peroxydisulfate, such as an Fe(III) salt, is particular preferred.

According to a particularly preferred embodiment the oxidizing agent is a mixture of $Fe_2(SO_4)_3$ and $Na_2S_2O_8$.

There are different ways for preparing the aqueous reaction medium. The thiophene monomer can be dissolved or dispersed in the aqueous reaction medium followed by the addition of the oxidizing agent(s), which can also be dissolved or dispersed in an aqueous phase, or the oxidizing agent(s) is/are first dissolved or dispersed the aqueous reaction medium, followed by the addition of the thiophene monomer, which can also be dissolved or dispersed in a an aqueous phase.

If more than one oxidizing agent is used, for example a mixture of $Fe_2(SO_4)_3$ and $Na_2S_2O_8$, it is furthermore possible to first mix one of these components with the thiophene monomer in the aqueous reaction medium followed by the addition of the second oxidizing agent.

The oxidative polymerization is preferably carried out under an inert atmosphere as disclosed in EP-11453877 (Agfa Gevaert). The oxygen content of the reaction medium when the oxidizing agent, for example a salt of peroxydisulfate, is added to it is preferably less than 3 mg per liter, more preferably less than 1.5 mg/liter, most preferably less than 0.5 mg/liter.

The concentration of oxygen in the reaction medium can be regulated by any means, such as freeze-thaw techniques, prolonged bubbling of an inert gas such as Argon, Nitrogen or Helium though the reaction medium, consumption of oxygen in a sacrificial reaction under an inert gas blanket. The inert gas is preferably bubbled through the reaction medium until the polymerization is completed thereby maintaining the oxygen concentration below 3 mg/l.

The oxidative polymerization is preferably carried out at low pH, as disclosed in EP-A 1384739 (Heraeus). The pH is preferably 1.5 or less, more preferably 1.00 or less.

To adjust the pH, an acid is preferably selected from the group of water-soluble inorganic acids and water-soluble organic acids. Examples of inorganic acids are hydrochloric acid, sulfuric acid, nitric acid and phosphoric acid. Examples of organic acids include p-toluenesulfonic acid, benzenesulfonic acid, methanesulfonic acid and trifluoromethanesulfonic acid.

The temperature of the reaction mixture is preferably between 0 to 100° C., more preferably between 0 to 50° C., most preferably between 5 and 30° C.

The amount of thiophene monomers and polyanions in the reaction mixture are chosen so that stable polythiophene/polyanion dispersions are obtained of which the solid content is preferably from 0.05 to 25 wt %, more preferably from 0.1 to 10 wt %, most preferably from 0.8 to 2 wt %.

After the polymerization reaction is completed the liquid composition may be further purified, for example by means of filtration, in particular by means of ultrafiltration, and/or by a treatment with ion exchanger, in particular by a treatment with an anion exchanger and a cation exchanger.

After the purification step, the conductive polymer dispersion may be further optimized for the application wherein it will be used. For example, when used for preparing a polymer capacitor, a polymer capacitor formulation described below may be prepared from the conductive polymer dispersion.

Various homogenization techniques may be used during the preparation of the conductive polymer. The homogenizing techniques may be selected from:

ultrasonic homogenization techniques;
pressure homogenization techniques; and
mechanical homogenization techniques.

Preferred mechanical homogenizers are rotor-stator homogenizers and blade type homogenizers. Another mechanical homogenization technique may be the use of a spinning disk reactor.

Preferred high-pressure homogenizers, such as for example a Gaulin homogenizer or an Ariete homogenizer, force the dispersion through a very narrow channel or orifice under pressure. Another preferred high-pressure homogenizer is a microfluidizer.

Two or more homogenizers may be used in combination, preferably in a consecutive way.

The homogenization techniques may be used before, during and after the polymerization reaction. These homogenization techniques may also be used during the preparation of the liquid formulation described below.

Liquid Formulation

Depending on the application wherein the conductive polymer dispersion is used additional ingredients may be added to conductive polymer dispersion thereby forming a liquid formulation optimized for the application.

For example when used to prepare a polymer capacitor, such a liquid formulation may be referred to as a polymer capacitor formulation.

All or part of the additional ingredients described below may also be added to the conductive polymer dispersion referred to above.

In addition to the conductive polymer and the polyanion described above the formulation may comprise further additives such as surface-active substances, adhesion promoters, crosslinking agents, binders, conductivity increasing compounds, heat- and moisture-stability improving compounds, acidic compounds, and alkaline compounds.

The surface-active compounds may be:
anionic surfactants such as alkylbenzenesulphonic acids and salts, paraffin sulphonates, alcohol sulphonates, ether sulphonates, sulphosuccinates, phosphate esters, alkyl ether carboxylic acids or carboxylates;
cationic surfactants such as quaternary alkylammonium salts;
nonionic surfactants such as linear alcohol ethoxylates, oxo alcohol ethoxylates, alkylphenol ethoxylates or alkyl polyglucosides; and
zwitterionic surfactants such as compounds comprising both a carboxylic acid group and a quaternary ammonium group, for example lauryl-N,N-(dimethyl-ammonio)-butyrate and lauryl-N,N-(dimethyl)-glycine-betaine; compounds comprising both a sulfuric acid group and quaternary ammonium group, for example 3-[(3-cholamido-propyl)dimethylammonio]-1-propanesulfonate, 3-(4-tert-butyl-1-pyridinio)-1-propanesulfonate, 3-(1-pyridinio)-1-propanesulfonate and 3-(benzyl-dimethyl-ammonio)propanesulfonate; compounds comprising both a phosphoric acid group and a quaternary ammonium group, for example with hexadecyl phosphocholine; compounds comprising a quaternary ammonium group with an attached hydroxy group, for example lauryldimethylamine N-oxide; and phospholipids, which consist of a quaternary ammonium head coupled via a phosphate group and glycerol to two hydrophobic fatty acids.

Particular preferred surfactants are the commercially available surfactants available under the trademarks Dynol® and Zonyl®.

Preferred adhesion promoters are organofunctional silanes or hydrolysates thereof such as 3-glycidoxypropyl-trialkoxysilane, 3-amino-propyl-triethoxysilane, 3-mercaptopropyltrimethoxysilane, 3-methacryloxypropyl-trimethoxysilane, vinyltrimethoxysilane or octyltriethoxysilane.

Preferred crosslinking agents are melamine compounds, blocked isocyanates, functional silanes such as tetraethoxysilane, alkoxysilane hydrolysates, such as tetraethoxysilane, epoxysilanes, such as 3-glycidoxypropyltrialkoxysilane.

Preferred binders are polyurethanes, polyacrylates or polyolefins.

Preferred conductivity increasing are:
compounds containing ether groups such as e.g. tetrahydrofuran;
compounds containing lactone groups such as γ-butyrolactone or γ-valero-lactone;
compounds containing amide or lactam groups such as caprolactam, N-methylcaprolactam, N,N-dimethylacetamide, N-methylacetamide, formamide, N,N-dimethylformamide (DMF), N-methyl-formamide, N-methylformanilide, N-methyl-2-pyrrolidone (NMP), N-octyl-pyrrolidone, 2-pyrrolidone, N-butyl-pyrrolidone, and N-hydroxyethyl-pyrrolidon;
sulphones and sulphoxides such as sulpholane (tetramethylene sulphone) or dimethylsulphoxide (DMSO);
sugar or sugar derivatives such as arabinose, saccharose, glucose, fructose or lactose;
di- or polyalcohols such as sorbitol, xylitol, mannitol, mannose, galactose, sorbose, gluconic acid or ethylene glycol, di- or tri(ethylene glycol), 1,1,1-trimethylol-propane, 1,3-propanediol, 1-,2-propane-diol, 1,5-pentanediol, 1,2,3-propanetriol, 1,2,4-butanetriol or 1,2,6-hexanetriol, aromatic di- or polyalcohols such as resorcinol.

Particularly preferred conductivity increasing compounds are selected from the groups consisting of N-methyl-pyrrolidinone, N-butyl-pyrrolidone, N-hydroxyethyl-pyrrolidone, DMSO, ethylene glycol and diethylene glycol.

Preferred stability improving compounds are gallic acid derivatives.

The polymer capacitor formulation may have a pH of from 1 to 14, more preferably a pH of from 1 to 8. For corrosion-sensitive dielectrics, such as aluminium oxides or niobium oxides, the polymer capacitor formulation preferably has a pH of from 2.5 to 8, in order not to damage the dielectric.

To adjust the pH bases or acids as described in WO2010/003874 on page 4, lines 13-32 are preferably used. These compounds do not impair the film formation of the polymer capacitor formulation and are not volatile at higher temperatures such as soldering temperatures. Preferred compounds are the bases 2-dimethylaminoethanol, 2,2'-iminodiethanol or 2,2',2"-nitrilotriethanol and the acid polystyrenesulphonic acid.

The viscosity of the polymer capacitor formulation is typically optimized as function of the application method and may be between 0.01 and 1 000 mPa·s (measured with a rheometer at 20° C. and a shear rate of $100 \text{ s}^{-1}$). Preferably, the viscosity is from 1 to 500 mPa·s, more preferably between from 1 to 250 mPa·s. In the case of the production of aluminium wound capacitors the viscosity is preferably from 1 to 200 mPa·s while in the production of tantalum electrolytic capacitors or aluminium stacked capacitors the viscosity is preferably from 1 to 50 mPa·s.

The adjustment of the viscosity can, for example, be accomplished by adding appropriate rheology modifiers as a further additive.

As mentioned above, the particle size of the dispersed conductive polymer may have an influence on the impregnation of the porous anode body. The median particle size ($d_{50}$) of the polythiophene/polyanion particles is preferably from 1 to 150 nm, more preferably from 2 to 50 nm, most preferably from 5 to 40 nm. The $d_{50}$ particle size is preferably measured by laser diffraction or Centrifugal Liquid Sedimentation (CPS).

The solids content of a polymer capacitor formulation is preferably from 0.01 to 20 wt %, more preferably from 0.1 to 15 wt %, most preferably from 0.25 to 10 wt %, in each case based on the total weight of the formulation.

Polymer Capacitor

A polymer capacitor, also referred to as a polymer electrolyte capacitor, is an electrolytic capacitor comprising a solid conductive polymer electrolyte.

Electrolytic capacitors use a chemical feature of some special metals, often referred to as so-called valve metals, that by anodic oxidation form an insulating oxide layer. By applying a positive voltage to the anode material in an electrolytic bath an oxide barrier layer with a thickness corresponding to the applied voltage may be formed. This oxide layer acts as the dielectric in the electrolytic capacitor. To increase the capacitors capacitance the anode surface is roughened and so the oxide layer surface also is roughened.

To complete the capacitor, a counter electrode has to match the rough insulating oxide surface. This is accomplished by the electrolyte, which acts as the cathode electrode of an electrolytic capacitor.

The main difference between the polymer capacitors is the anode material and its oxide used as the dielectric:
  Polymer tantalum electrolytic capacitors use high purity sintered tantalum powder as an anode with tantalum pentoxide ($Ta_2O_5$) as a dielectric; and
  Polymer aluminium electrolytic capacitors use a high purity and electrochemically etched (roughened) aluminium foil as an anode with aluminium oxide ($Al_2O_3$) as the dielectric.

The porous metal layer (anode) covered with its oxide layer (dielectric) is referred to herein as a porous anode body.

Method of Preparing Polymer Capacitor

The method of preparing the polymer capacitor according to the present inventions comprises the step of introducing the polymer capacitor formulation into at least part of a porous anode body.

The polymer capacitor formulation may be introduced into the porous anode body by any known process such as impregnation, dipping, pouring, dripping on, spraying, misting on, knife coating, brushing or printing, for example ink-jet, screen or tampon printing.

Preferably, the polymer capacitor formulation is introduced into at least part of the porous anode body by dipping body into the polymer capacitor formulation and thus impregnating it with the liquid composition.

The dipping into or the impregnation with the liquid composition is preferably carried out for a period of from 1 second to 120 minutes, more preferably of from 5 seconds to 60 minutes, most preferably in a range of from 10 seconds to 15 minutes. The introduction of the liquid composition into the anode body can be facilitated, for example, by increased or reduced pressure, vibration, ultrasound or heat.

After the porous anode bodies have been impregnated with the liquid composition, the solvent contained in the liquid composition is preferably, at least partially, removed to obtain a solid electrolyte which completely or partly covers the dielectric thereby forming a capacitor body. The coverage of the dielectric by the solid electrolyte is preferably at least 10%, more preferably at least 25%, most preferably at least 50%. The coverage may be as is described in DE-A-10 2005 043 828.

The solvent is preferably removed by removing the electrode body from the liquid composition and drying it. The drying step is preferably carried out at a temperature of from 20° C. to 260° C., more preferably of from 50° C. to 220° C., most preferably of from 80° C. to 200° C.

The dipping and the drying step may be repeated once or several times to adapt the thickness of the solid electrolyte layer deposited on the dielectric or the degree of filling of the electrolyte in the electrode body to the particular requirements.

It may be advantageous to use both self-doped and foreign-doped polythiophenes for the formation of the polymer cathode layer. Both types of polythiophene polymers may be combined in a single polymer capacitor formulation and introduced as described above. However, it is preferred that both types of polythiopenes are introduced in the capacitor using different polymer capacitor formulations each comprising a self-doped or a foreign-doped polythiophene. Preferably, first a self-doped polythiopene is introduced into the porous anode body followed by the introduction of the foreign-doped polythiophene. Using both self-doped and foreign-doped polythiophenes is disclosed in for example WO2014/048562 (Heraeus) and US2016/0351338 (AVX).

After the capacitor bodies have been produced in this manner, they can be further modified by the method and manner known to the person skilled in the art. In the case of a tantalum electrolytic capacitor, the capacitor bodies can be covered, for example, with a polymeric outer layer, as is described in DE-A-10 2004 022674 or DE-A-10 2009 007 594, and/or a graphite layer and a silver layer, as is known from DE-A-10 2005 043 828, while in the case of an aluminium wound capacitor, in accordance with the teaching of U.S. Pat. No. 7,497,879 B2, the capacitor body is incorporated into an aluminium beaker, provided with a sealing glass and firmly closed mechanically by crimping. The capacitor can then be freed from defects in the dielectric in a known manner by ageing.

EXAMPLES

Materials

All materials used in the following examples were readily available from standard sources such as ALDRICH CHEMICAL Co. (Belgium) and ACROS (Belgium) unless otherwise specified. The water used was deionized water.

EDOT is 3,4-ethylenedioxythiophene commercially available from Heraeus.

PSS is a 5.85 wt % aqueous solution of polystyrenesulfonic acid having a Mw of 300 kDa prepared according to a method disclosed in Houben-Weyl, Methoden der organischen Chemie, Vol. E 20, Makromolekulaire Stoffe, Teil 2 (1987), page 1141).

Lewatit® MonoPlus M600 is a basic, gelular anion exchange resin commercially available from Lanxess AG.

Lewatit® MonoPlus S 108 H is an acidic, gelular anion exchange resin commercially available from Lanxess AG.

Methods

Surface Resistance Measurement

The surface resistance SER was measured at room temperature using a two point probe method.

Particle Size Measurement

The median particle size ($d_{50}$) and $d_{90}$ particle size were determined by centrifugal liquid sedimentation particle size analysis on a CPS instruments Model MOD DC24000 UHR Disc centrifuge.

Capacitance Measurement

The capacitance of a capacitor was measured at 120 Hz at room temperature with a potentiostat.

ESR Measurement

The equivalent series resistance (ESR) was measured at 100 kHz at room temperature with a potentiostat.

Example 1

Synthesis of Monomer I-7

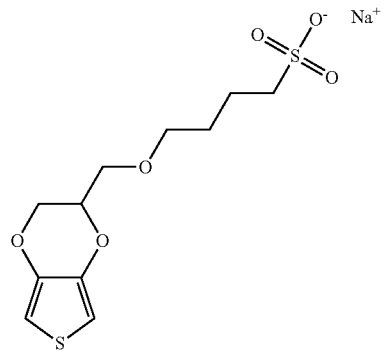 [SMILES: [Na+] ; O=S(=O)([O-])CCCCOCC1COc2cscc2O1]

Sodium hydride (60 wt % dispersion in mineral oil, 11.04 g, 276 mmol) and tetrahydrofuran (THF, 68.8 mL) were added to a three neck round bottom flask and stirred and blanketed by nitrogen.

A solution of thieno[3,4-b]-1,4-dioxin-2-methanol (34.40 g, 200 mmol) in THF (206.4 mL) was added dropwise to the stirring mixture. Afterwards, the reaction was stirred for 1 hour. A solution of 1,4-butane sultone (31.33 g, 230 mmol) in THF (68.8 mL) was then added. Next, the reaction mixture was refluxed for 1 hour. Afterwards, the reaction was cooled down to room temperature, methyl-tert-butyle-ther (MTBE, 500 mL) was added and the mixture stirred for 10 min.

The reaction mixture was decanted, MTBE (500 mL) was added a second time and the mixture was further stirred for 30 min.

The formed precipitate (66.5 g) was filtered, washed with MTBE and dried under vacuum at 22° C. A recrystallization of the powder was performed in a mixture of isopropanol (375 mL) and an aqueous NaOH solution (8 wt %, 70 mL). The residue was filtered, washed with isopropanol and dried under vacuum to obtain Monomer I-7 (64.5 g, 97.6%) as an off-white powder.

Example 2

Synthesis of COPOL-01a:PSS 65.5 g of an aqueous solution of PSS, deionized water (325 mL), nitric acid (4.3 g, 48.14 mmol) were mixed in a reaction vessel. Iron(III) sulfate (0.16 g, 0.4 mmol) and sodium persulfate (3.15 g, 13.24 mmol) were added.

The reaction mixture was stirred and cooled to 5° C. under nitrogen flow for 90 min. The oxygen level is below 30 ppb.

EDOT (1.36 g, 9.61 mmol) and an aqueous solution of Monomer I-7 (0.80 g in 7.3 mL water, 2.4 mmol) were added to the reaction mixture and stirred for 20 hours at 5° C. under nitrogen.

The reaction mixture was treated with ion exchanger (110 g Lewatit® MonoPlus M600+60 g Lewatit® MonoPlus S 108 H, filtered and washed 2×50 mL water, repeated).

The resulting viscous mixture was treated with high shear homogenization (Lab Gaulin, 4×600 bar). The dispersion was concentrated in vacuo. This procedure yielded a blue dispersion of COPOL-01a:PSS in water (1.11 wt %).

Example 3

Synthesis of COPOL-01b:PSS to COPOL-09:PSS

A series of copolymerizations with varying amounts of EDOT, Monomer I-7 and PSS according to Table 2 were carried out as described in Example 2.

In Table 2 the amounts of EDOT and Monomer I-7 are shown (both in g) together with the amount of the PSS solution and water used in each case. Table 2 also indicate the molar ratio of EDOT/Monomer I-7.

TABLE 2

|  | EDOT (g) | Monomer I-7 (g) | [Monomer I-7]/[EDOT] | PSS (g) | Water (g) |
| --- | --- | --- | --- | --- | --- |
| COPOL-01a:PSS | 1.36 | 0.80 | 1/4 | 65.5 | 325 |
| COPOL-01b:PSS | 1.36 | 0.80 | 1/4 | 65.5 | 325 |
| COPOL-01c:PSS | 1.36 | 0.80 | 1/4 | 65.5 | 325 |
| COPOL-02:PSS | 1.27 | 1.00 | 1/3 | 63.7 | 330 |
| COPOL-03:PSS | 1.20 | 1.20 | 3/7 | 61.7 | 330 |
| COPOL-04:PSS | 1.10 | 1.40 | 35/65 | 59.8 | 330 |
| COPOL-05:PSS | 1.02 | 1.59 | 2/3 | 58.0 | 335 |
| COPOL-06:PSS | 0.93 | 1.80 | 45/55 | 55.9 | 335 |
| COPOL-07:PSS | 0.85 | 2.00 | 1/1 | 54.0 | 338 |
| COPOL-08:PSS | 0.67 | 2.39 | 3/2 | 50.2 | 340 |
| COPOL-09:PSS | 0.35 | 3.16 | 4/1 | 42.6 | 345 |

Comparative Examples 1 to 5

Synthesis of PEDOT:PSS

A series of polymerizations with varying amounts of EDOT and PSS according to Table 3 were carried out as described in Example 2.

In Table 3 the amounts of EDOT, PSS and the other components used in the reaction are shown.

TABLE 3

|  | EDOT (g) | PSS (g) | $HNO_3$ (g) | $Fe_2SO_4$ (g) | $Na_2S_2O_8$ (g) | Water (g) | Lewatit® MonoPlus M600 | Lewatit® MonoPlus S 108 H |
| --- | --- | --- | --- | --- | --- | --- | --- | --- |
| COMP-01 | 1.71 | 73.3 | 4.3 | 0.16 | 3.15 | 325 | 110 | 60 |
| COMP-02 | 2.00 | 68.4 | 5.1 | 0.18 | 3.69 | 330 | 130 | 70 |
| COMP-03 | 2.40 | 61.5 | 6.1 | 0.22 | 4.43 | 336 | 150 | 80 |
| COMP-04 | 2.67 | 57.0 | 6.8 | 0.24 | 4.92 | 340 | 170 | 90 |
| COMP-05 | 2.06 | 88.7 | 14.3 | 0.094 | 3.48 | 389 | 130 | 70 |

PSS, deionized water, and nitric acid were mixed in a reaction vessel. Iron(III) sulfate and sodium persulfate were added.

The reaction mixture was stirred and cooled to 5° C. under nitrogen flow for 90 min. The oxygen level was below 30 ppb.

EDOT was added to the reaction mixture and stirred for 20 hours at 5° C. under nitrogen.

The reaction mixture was treated with ion exchanger (Lewatit® MonoPlus M600+Lewatit® MonoPlus S 108 H, filtered and washed 2×50 mL water, repeated). The resulting viscous mixture was treated with high shear homogenization (Lab Gaulin, 4×600 bar). The dispersion was concentrated in vacuo.

This procedure yielded blue dispersions of PEDOT:PSS in water.

Comparative Example 6: Synthesis of Homopolymer of EDOT-S

EDOT-S (10.8 g, 32.49 mmol), water (198 mL) and sulfuric acid (96%, 6.6 g, 64.98 mmol) were mixed in a reaction vessel.

The reaction mixture was stirred at 20° C. under nitrogen flow for 90 min. The oxygen level was kept below 30 ppb.

An aqueous solution of iron(III) chloride (50 wt %, 6.32 g, 19.5 mmol) was added. Then, an aqueous solution of sodium persulfate (15 wt %, 93.2 mL, 64.98 mmol) was added slowly to the reaction mixture and it is stirred for 3 hours at 20° C. under nitrogen.

The reaction mixture was treated with ion exchanger (245 g Lewatit® MonoPlus M600+145 g Lewatit® MonoPlus S 108 H, filtered and washed 2×100 mL water, repeated). The resulting viscous mixture was treated with high shear homogenization (Lab Gaulin, 2×700 bar). The dispersion was concentrated in vacuo. This procedure yielded a blue dispersion of PEDOT-S in water (1.26 wt %).

Comparative Example 7: PEDOT:PSS and PEDOT-S Mixture

A 50/50 wt % mixture of PEDOT:PSS, prepared in Comparative Example 1, and the homopolymer of EDOT-S was made. This mixture was evaluated in the same manner as the P(EDOT:EDOT-S):PSS copolymers.

Example 4

The polymers prepared in Examples 2-3 and Comparative Examples 1-7 were evaluated by the characterization techniques described above. The results are shown in Table 4.

The ratio of the molar amount of the functional groups of the polyanion (in this case the molar amount of sulfonic groups of PSS) to the sum of the monomeric units according to Formula I (Monomer I-7) and Formula II (EDOT) of the polythiophene is shown as [SO$_3$H-group PSS]/[total monomer].

TABLE 4

| | [Monomer I-7]/[EDOT] | [SO$_3$H-group PSS]/[total monomer] | SER Ω/□ | D$_{50}$ (nm) | D$_{90}$ (nm) |
|---|---|---|---|---|---|
| COPOL-01a:PSS | 1/4 | 1.73 | 63 | 24 | 58 |
| COPOL-01b:PSS | 1/4 | 1.73 | 67 | 21 | 36 |
| COPOL-01c:PSS | 1/4 | 1.73 | 60 | 25 | 59 |
| COPOL-02:PSS | 1/3 | 1.69 | 63 | 25 | 61 |
| COPOL-03:PSS | 3/7 | 1.63 | 54 | 23 | 52 |
| COPOL-04:PSS | 35/65 | 1.59 | 56 | 22 | 39 |
| COPOL-05:PSS | 2/3 | 1.54 | 71 | 22 | 35 |
| COPOL-06:PSS | 45/55 | 1.48 | 60 | 22 | 35 |
| COPOL-07:PSS | 1/1 | 1.43 | 68 | 19 | 32 |
| COPOL-08:PSS | 3/2 | 1.33 | 88 | 21 | 30 |
| COPOL-09:PSS | 4/1 | 1.13 | — | 22 | 33 |
| COMP-01 | 0/100 | 1.93 | 58 | 39 | 107 |
| COMP-02 | 0/100 | 1.54 | 50 | 46 | 126 |
| COMP-03 | 0/100 | 1.16 | 58 | 72 | 221 |
| COMP-04 | 0/100 | 0.96 | 83 | 85 | 266 |
| COMP-05 | 0/100 | 1.93 | 66 | 38 | 102 |
| COMP-06 | 100/0 | — | 96 | 21 | 27 |
| COMP-07 | — | — | 100 | 22 | 44 |

COPOL-01a:PSS to COPOL-09:PSS are copolymers of Monomer I-7 (EDOT-S) and EDOT with varying ratios of both monomers and a varying ratio [SO$_3$H-group PSS]/[total monomer].

COMP-01 to COMP-05 include PEDOT homopolymers. Here we see that decreasing the amount of PSS results in an increase of the particle diameter making these conductive polymers less suitable for capacitor application.

COMP-06 is a homopolymer of Monomer I-7 (EDOT-S) having a particle size useful for capacitor applications. However the SER is too high.

COMP-07 is a mixture of PEDOT:PSS and PEDOT-S. The SER and particle size are too high.

The inventive copolymers 01 to 09 combine a low SER with low particle diameters making them particularly suitable for capacitor applications.

The best results are obtained with copolymers having a [Monomer I-7]/[EDOT] ratio between 35/65 and 1/1 and a [SO$_3$H-group PSS]/[total monomer] ratio between 1.6 and 1.4.

Example 5: Preparation of Capacitors

A chemically converted aluminum foil including an etching layer on a surface was prepared as a valve metal base. A dielectric layer was formed to cover the aluminum foil. The resulting chemically converted aluminum foil was used as an anode component. The rated voltage of the alumina layer is 90 V and the capacitance is 6.4 μF/cm$^2$. A 20 μm thick sold mask was printed on the Al foil with arrays of openings of 10 mm×10 mm. The patterned foil was cut to 30 mm×105 mm strips with 5 openings on them.

The conductive polymer dispersions used in the manufacturing of the capacitors were formulated with water, diethyleneglycol and DYNOL™ 604 and treated with an ultrasound homogenization step prior to coating of the aluminum foils.

The strip was dip-coated with COPOL-01b:PSS dispersion and dried at 150° C. for 5 minutes. The dip-coating and curing steps were repeated for several times. Then, carbon paste and silver paste were sequentially screen-printed on the PEDOT layer and cured. The capacitance and equivalent series resistance (ESR) were measured as described above.

Additional capacitors were prepared and measured as described above where COPOL-01c:PSS, COPOL-02:PSS, COPOL-05:PSS and COMP-05 were used as conductive polymer dispersions.

In Table 5 the results of the capacitor evaluation are summarized.

TABLE 5

|  | Capacitance (μF) | ESR (mΩ) |
|---|---|---|
| COPOL-01b:PSS | 5.3 | 20.0 |
| COPOL-01c:PSS | 5.2 | 26.9 |
| COPOL-02:PSS | 5.5 | 46.2 |
| COPOL-05:PSS | 5.3 | 24.3 |
| COMP-05 | 4.9 | 97.0 |

It is clear from the results in Table 5 that the dispersions wherein a copolymer according to the present invention is used, the capacitance of the capacitors is higher while the ESR is lower.

The invention claimed is:

1. A polythiophene dispersion including:
   (a) a polythiophene copolymer of a first monomer according to Formula I and a second monomer according to Formula II,

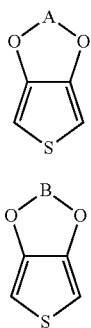

Formula I

Formula II wherein
   A represents a substituted or unsubstituted $C_1$ to $C_5$ alkylene bridge further functionalized with at least one functional group selected from the group consisting of a sulfonic acid or salt thereof, a phosphonic acid or salt thereof, a phosphate ester or salt thereof, a sulfate ester or salt thereof, and a carboxylic acid or salt thereof;
   B represents a substituted or unsubstituted $C_1$ to $C_5$ alkylene bridge with the proviso that B is not further functionalized with a pH responsive group; and
   a molar ratio of the first monomer to the second monomer is from 1/4 to 4/1, and
   (b) a polymeric polyanion wherein at least 75 mol % of the monomeric units of the polymeric polyanion are functionalized with a functional group selected from the group consisting of a sulfonic acid or salt thereof, a phosphonic acid or salt thereof, a phosphate ester or salt thereof, a sulfate ester or salt thereof, and a carboxylic acid or salt thereof,
   characterized in that a molar ratio of the functional groups of the polyanion to the sum of the first and second monomers of the polythiophene copolymer is from 1.1 to 1.75.

2. The polythiophene dispersion of claim 1, wherein the molar ratio of the first monomer to the second monomer is from 3/7 to 1/1.

3. The polythiophene dispersion of claim 1, wherein the molar ratio of the functional groups of the polyanion to the sum of the first and second monomers of the polythiophene copolymer is from 1.25 to 1.65.

4. The polythiophene dispersion of claim 1, wherein the first monomer has a chemical structure according to Formula I-a,

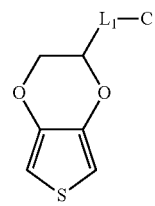

Formula I-a wherein
   $L_1$ represents a divalent linking group comprising 1 to 15 carbon atoms, and
   C represents a group selected from the group consisting of a sulfonic acid or salt thereof, a phosphonic acid or salt thereof, a phosphate ester or salt thereof, a sulfate ester or salt thereof, and a carboxylic acid or salt thereof.

5. The polythiophene dispersion of claim 1, wherein the first monomer has a chemical structure according to Formula I-b,

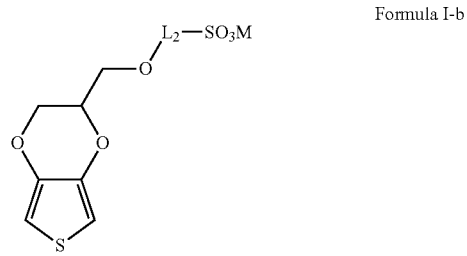

Formula I-b wherein
   $L_2$ represents a divalent linking group comprising no more than 10 carbon atoms,
   M represents a hydrogen or a counterion to compensate the negative charge of the sulfonate group.

6. The polythiophene dispersion of claim 1, wherein the second monomer is 3,4-ethylenedioxythiophene.

7. The polythiophene dispersion of claim 1, wherein the polymeric polyanion is poly (4-styrenesulfonic acid) or a salt thereof.

8. The polythiophene dispersion of claim 1, wherein a weight average molecular weight (Mw) of the polymeric polyanion is from 100,000 to 300,000 Da.

9. The polythiophene dispersion of claim 1, wherein the polythiophene and the polyanion are present as polythiophene/polyanion particles having a median particle size ($d_{50}$) measured by Centrifugal Liquid Sedimentation (CPS) from 5 to 40 nm.

10. A liquid formulation including the polythiophene dispersion according to claim 1.

11. The liquid formulation of claim 10, wherein the formulation has a pH from 2 to 8.5.

12. The liquid formulation of claim 10, wherein the viscosity of the formulation is from 1 to 250 mPa's, measured with a rheometer at 20° C. and a shear rate of 100 $s^{-1}$.

13. A method of preparing a polymer capacitor comprising a porous anode body including the step of introducing a liquid formulation according to claim 10 into at least a part of the porous anode body.

14. A method of preparing an electronic device comprising applying the liquid formulation according to claim 10 in preparation of a conductive layer in the electronic device.

15. The method of claim 14, wherein the electronic device is selected from photoconductive cells, photoresistors, photoswitches, phototransistors, phototubes, IR detectors, photovoltaic device, solar cells, coating materials for memory storage devices, field effect resistance devices, anti-static films, biosensors, electrochromic devices, solid electrolyte capacitors, hybrid capacitors, super capacitors, energy storage devices, batteries, and electromagnetic shielding.

* * * * *